Jan. 3, 1967  J. G. S. BILLINGSLEY ET AL  3,295,290
APPARATUS AND PROCESS FOR PACKAGING ARTICLES
IN SHRINKABLE FILMS
Filed April 9, 1963  2 Sheets-Sheet 1

INVENTORS
JOHN GEORGE SELBY BILLINGSLEY
HAROLD EUGENE RAMSEY
PAUL GLENN STEPHAN
BY Robert W. Black
ATTORNEY

INVENTORS
JOHN GEORGE SELBY BILLINGSLEY
HAROLD EUGENE RAMSEY
PAUL GLENN STEPHAN

BY  *Robert W Black*

ATTORNEY

United States Patent Office 3,295,290
Patented Jan. 3, 1967

3,295,290
APPARATUS AND PROCESS FOR PACKAGING ARTICLES IN SHRINKABLE FILMS
John George Selby Billingsley and Harold Eugene Ramsey, Newark, Del., and Paul Glenn Stephan, Landenburg, Pa., assignors to E. I. du Pont de Nemours and Company, Wilmington, Del., a corporation of Delaware
Filed Apr. 9, 1963, Ser. No. 271,732
6 Claims. (Cl. 53—28)

This invention relates to packaging and more particularly to a process and apparatus for packaging multiple units in shrinkable films.

The problems of constructing a machine which will make packages of multiple units of such items as cans and bottles at production speeds with heat-shrinkable films are numerous. One such problem is the arrangement in holding of the units in a position and in such a manner so that they can be wrapped with the film. Another problem is that of placing the film around the grouped units to be packaged. A further problem concerns the sealing and cutting of the film so as to form the individual packages. A still further problem is to heat-shrink the film in such a manner as to contain the product, to leave two sides open for handling and to make a more salable package. It is, therefore, an object of this invention to provide a process and apparatus for packaging multiple units in shrinkable films.

It is a further object of this invention to provide an integral process and apparatus for continuously packaging multiple units in heat-shrinkable films.

A still further object of this invention is to provide a heat-sealing process and apparatus which imparts stronger seals to heat-shrinkable films.

It is another object of this invention to eliminate the above problems.

These and other important objects and advantages of the invention will become apparent as the same is more fully understood from the following description, which, taken in connection with the accompanying drawings, discloses the preferred embodiment of the invention wherein.

Figure 1:
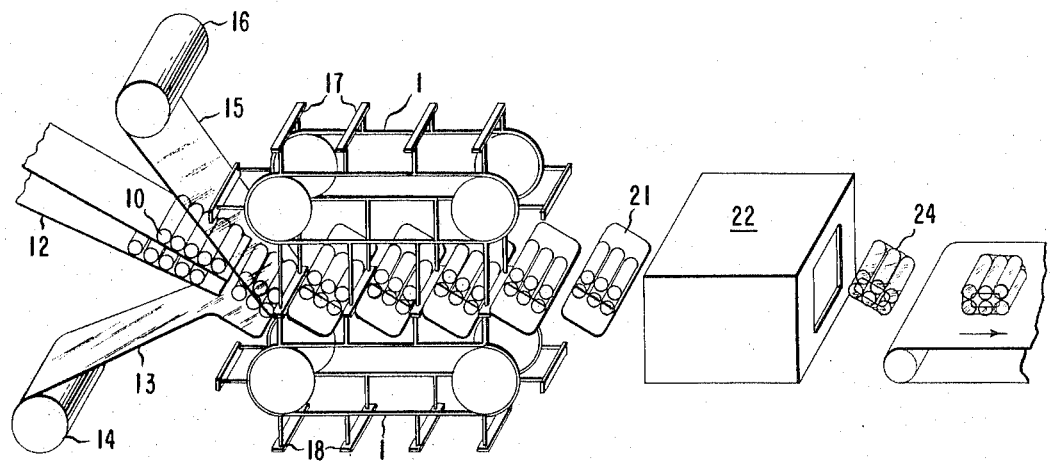
FIGURE 1 is an illustrative perspective view of an entire packaging process embodying the principles of the invention.
Figure 2:
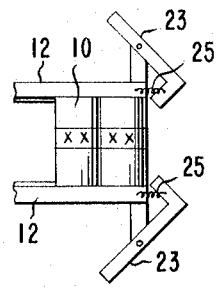
FIGURE 2 is a top view of the manual tripping device used in a machine of the present invention.

In FIGURE 1, the loading of cans 10 into a carriage 11 (not shown in FIGURE 1) is a two step manually operated gravity feed process. The cans are fed to the carriage in two separate chutes or tracks 12. As the carriage advances along the chain drive 1 into a position just under the end of the lower chute 12, the levers 23 as shown in FIGURE 2, are manually tripped and the cans, through the force of gravity, roll onto the carriage. The levers 23 are hook-shaped and kept under tension and in contact with the cans by a spring 25 which is attached to the long leg of the lever and to each of the upper and lower frames of chute 12. By simultaneously pushing the ends of the levers toward the cans, the cans in the chute are released. By releasing the levers, the spring action brings them back to their initial position to hold the cans in place.

When the carriage advances to a position just under the end of the upper chute, the cans in that chute are manually released, as for the lower chute, and roll onto the cans already in the carriage. The carriage then advances into the heat sealing cycle discussed hereinafter.

It is, of course, readily apparent that in a completely automatic packaging machine, conventional electrical or pneumatic loading equipment will be used. However, the gravity feed loader illustrated in this invention can be adapted for completely automatic operation by having the carriage actuate the levers holding the cans. For high speed packaging demanded in a commercial process, a conventional electrical or pneumatic loading device is used in which a ram or pusher device positions the cans in the carriage.

FIGURE 1 shows cans 10 being loaded as 6-packs; however, other units such as bottles or rectangular shaped objects can also be packaged in this manner. Also, the multi-pack unit need not be a 6-pack but can be a package of as low as 2 units.

A lower sheet of shrinkable film 13 having a transverse dimension greater than the length of the cans being packaged is unwound from the unwind roll 14 and passed under the cans and over the carriers. An upper sheet of shrinkable film 15 of the same dimension as film 13 is unwound from the unwind roll 16 and placed on top of the cans.

Two sheets of film which are driven separately are used to lessen the tension on the film and to avoid breakage. The drive for the two webs of film is directly connected with the speed of the entire unit in an appropriate manner so that the film will not be "paid out" at a faster rate than it is used. Since the reduction in roll diameter will cause a variable film speed, the film driving mechanism is preferably nip rollers which are synchronized with the output of the machine.

The preferred shrinkable film for use in the process and apparatus in the present invention is heat-shrinkable polyethylene. It is possible, however, to use any other film which will give adequate seals and which will shrink to the degree needed to form a package. Other such films which can be substituted are oriented, heat-shrinkable polyvinylchloride film, irradiated polyethylene, polystyrene, and polypropylene.

The two sheets of film, after being placed under and on top of the cans, are pulled into place by the clamping devices 17 and 18 on the heat seal unit. The upper clamps and heating elements 17 are mounted on upper endless belt 1 while the lower clamps 18 are mounted on lower endless belt 1. The upper and lower clamping and heating elements are means for continuously heat-sealing the opposite diagonal corners of the package forming a tube 21. The units in the tube of film are then passed into a heat-shrink tunnel 22. While FIGURE 1 is schematic, the chain drive assembly and the carriages will run directly into the shrink tunnel as a part of a continuous process. In the heat-shrink tunnel, the film is shrunk around the units and forms a package 24 with two substantially oval open ends. The finished packages then are conveyed to a loading area.

Figure 3:
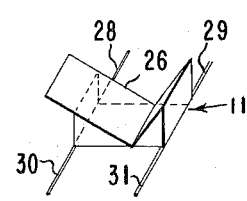
FIGURE 3 is a perspective view showing the carriage detail.
Figure 4:
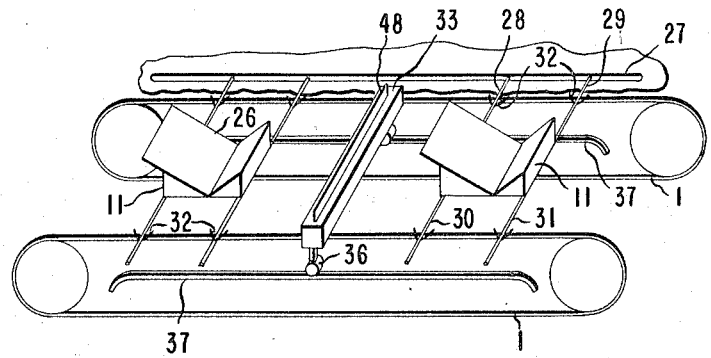
FIGURE 4 is a perspective view showing the relationship between the carriages and lower heat seal assembly.

FIGURES 3 and 4 show the detail of the carriage and its relationship to the lower heat-seal assembly. The carriage 11 used in the present embodiment is constructed of rods formed in any shape desired to fit the articles being packaged. In the embodiment shown in the present invention, it is desirable to have a substantially rectangular package and, therefore, the receiver portion 26 of the carriage is constructed in the shape of a right angle.

The carriage is guided by two slots 27 (only one of which is shown in FIGURE 4) mounted in an appropriate frame, not shown. The ends of the carriage 28, 29, 30, 31 are inserted in the slots. Hooks 32, permanently mounted to chain drive 1, upon coming to the topmost position of the chain drive, catch the ends of the carriage and carry it through the loading and sealing cycles. At the end of the cycle, the hooks disengage and leave the carriage at the end of the slots. In the embodiment shown in the drawings, the carriages are manually returned to the beginning of the cycle where again the hooks engage the carriage and carry it through the cycle. In an automated unit, the carriages can be permanently mounted to the chain drive and the whole unit can proceed through the heat shrink tunnel. The completed package is then released and the carriage returned to the beginning of the cycle.

Figure 5:
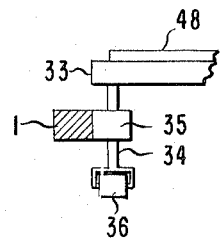
FIGURE 5 is a partial sectional view showing the mounting of the lower heat seal assembly to the chain drive.

Between each of the carriages, the lower assembly clamping bar 33 is permanently mounted to the chain drive. The detail of this mounting is shown in FIGURE 5. The rod 34 is attached to clamping bar 33 and passes through a ball bushing 35 which is permanently attached to the side of chain 1. On the bottom of rod 34 is attached a roller follower 36 which rides on tracks 37 shown in FIGURE 4 when the clamping bar 33 is in the up-right position. Tracks 37 are sloped at each end so that clamping bar 33 together with the upper assembly clamps the film at the right location in the cycle. When the film is clamped in place, the sealing operation proceeds.

Figure 6:
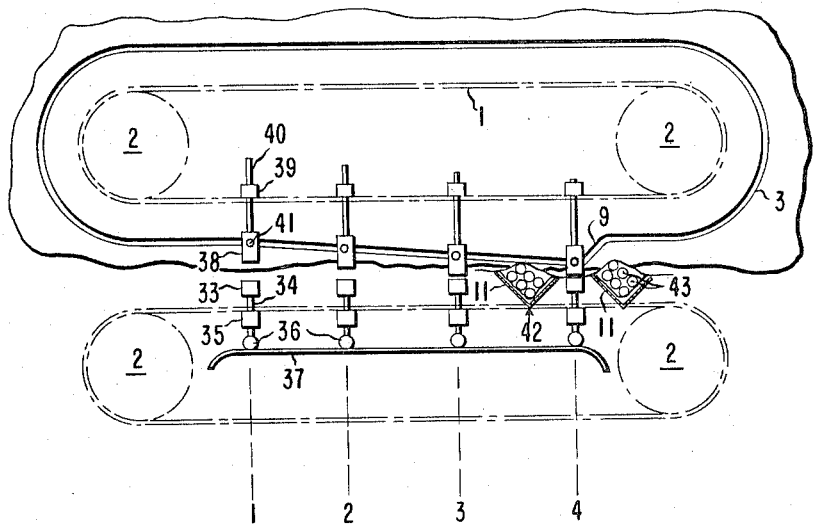
FIGURE 6 is a side elevational view showing the loading and heat-sealing of the units and the relationship between the upper and lower heat seal units.
Figure 7:
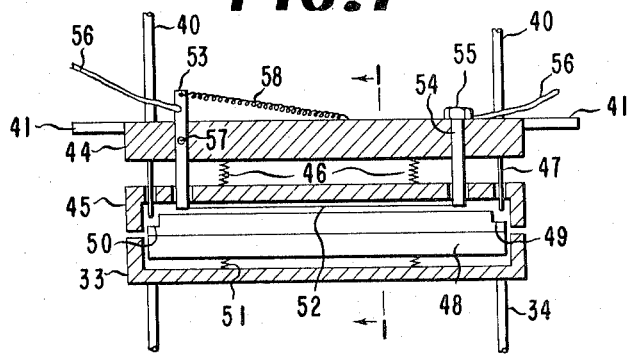
FIGURE 7 is a front sectional view showing the details of the upper and lower heat seal units.

The operation of the top heat-sealing assembly and its relationship to the bottom assembly is shown in FIGURE 6. The upper heat-sealing assembly 38 is attached to the upper chain drive 1 by a ball bushing 39 as accomplished for the lower clamping bar 33. Rod 40 passes through the ball bushing and attached to the upper surface of assembly 38. Here as for the lower clamping bar the ball bushing is attached to the side of chain 1 so as not to interfere with sprocket 2. The upper assembly 38 is guided throughout the clamping and sealing cycles by a track or slot 3 mounted in an appropriate frame (not shown). Pins 41, extending from both sides of the upper assembly, ride in slot 3.

As the upper assembly comes about, it is guided into clamping and sealing positions until it reaches point 42, at which time it disengages and unclamps the sealed films. Clamping and sealing positions can also be attained by having the upper assembly coupled to an electrically or pneumatically operated mechanism which lowers the assembly into place.

As the bottom assembly comes from its inverted position to an up-right position, the roller follower 36 is guided by track 37 and the assembly is kept on a stationary plane in the four positions illustrated in FIGURE 6. When the top assembly advances to position 1, it begins to advance down the incline plane of guide track 3. Rod 40 slides freely in ball bushing 39. By position 3, the clamping and sealing cycle of the heat-sealing process is complete. The upper and lower clamps remain engaged to allow the seals to cool without being subjected to tension. The clamps also serve to pull the two sheets of film into place so that the articles can be loaded. Upon reaching position 4, the heat seal formation is completed, the upper assembly becomes disengaged and the lower assembly falls as roller 36 drops off track 37.

In FIGURE 6, two article filled tubes 42 and 43 have been shown to show the close relationship between the carriages and upper and lower assemblies.

In FIGURES 7-13, the upper assembly 38 is constructed of a stationary bar 44 which is connected to the chain drive 1 by support rods 40 and to movable clamping bar 45 by springs 46. Pins 41, extending from each end of stationary bar 44, are employed to guide the upper assembly in track 3 of the packaging unit. Pins 47 attached near the outer ends of the undersurface of stationary bar 44 extend through openings in the top surface of clamping bar 45 to engage and depress at notches 49 and 50 on tucker bar 48 which is resiliently mounted and kept in position in the substantially hollow interior of lower clamping bar 33 by means of springs 51 as the upper assembly is brought into contact with the lower assembly.

Wedge shaped tucker bar 48, which can either form an upward or downward loop in the films, is shown to be actuated by mechanical means, i.e., pins 47. It should be fully realized, however, that the tucker bar can be actuated by electrical or pneumatic means.

A heated sealing wire 52 is suspended from two supports 53 and 54 mounted on and depended from stationary bar 44 and extends through openings in the upper surfaces of clamping bar 45 into the substantially hollow interior of the clamping bar. Support 54 is an insulated conductive metal rod which is permanently attached to stationary bar 44 by a nut 55. Outside electrical power is brought to the sealing wire unit by wires 56.

The hot wire sealing element is preferably a Nichrome resistance wire which can either be kept heated at all times or only during the part of the cycle in which it is in operation. The temperature of the wire must be high enough to allow the wire to clean itself and also perform the function of shrinking, severing and fusing the films. This temperature is preferably about 800° F.

Support 53 for sealing wire 52 is a movable insulated conductive rod which pivots on insulated pin 57. The upper end of support rod 53 is attached to stationary bar 44 by a spring 58 in order to keep the sealing wire under tension. Since the wire will expand when heated, it must be kept taut to give neat and precise heat seals. The bottom end of both movable support 53 and fixed support 54 is notched to allow the easy removal and insertion of the sealing wire.

Figures 8, 9, 10, 11, 12, 13:
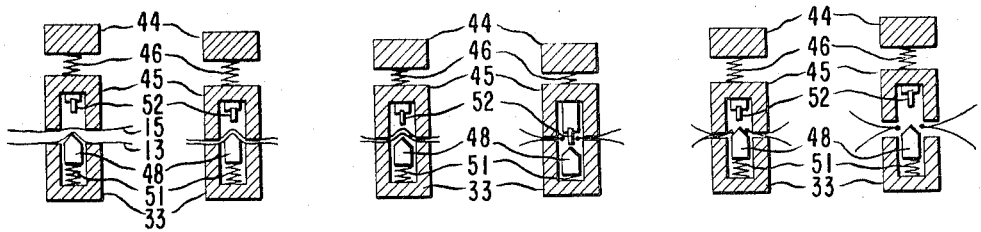
FIGURES 8–13 are cross-sectional views taken along the line 1—1 of FIGURE 7 which show the heat sealing sequence.

The heat-sealing sequence is shown in FIGURES 8-13. In FIGURE 8, films 13 and 15 have been pulled in place over and under clamping bars 33 and 45. This corresponds to position 1 shown in FIGURE 6. As the upper assembly is guided by pins 41 down track 3, upper clamping bar 45 will come in contact with lower clamping bar 33 and clamp the films in place as shown in FIGURE 9. As the assembly further advances down the track, spring 46 is compressed and pins 47 depress tucker bar 48, thereby forming a loop in the films as shown in FIGURE 10.

As sealing wire 52 advances, it shrinks the loop formed in the films and severs the shrunken loop into two sections, as shown in FIGURE 11, while the films are firmly clamped in place by the lower and upper clamping bars. When the upper assembly reaches point 9 shown on FIGURE 6, it is rapidly retracted. As this happens, tucker bar 48 moves back into position to cool the heat seals formed on the films. However, as shown in FIGURE 12, spring 46 on the upper assembly allows for a slight time lag in the withdrawal of clamping bar 45 which allows the films to remain clamped while the heat seals are cooling, thereby reducing stresses in the seal area. Placing the heat seals in the opposite diagonal corners of the package so that they are backed by the individual articles also tends to reinforce the seals and make them more durable.

After the tubular package has been completed, the packaged units are brought into the shrink tunnel 22 and the film on these units is shrunk around the articles. For a two step shrink operation, the open sides of the tubular package are first subjected to hot air, thereby shrinking the sides of the unit. Subsequently, the entire unit which comprises the main body and the extended film sides, is subjected to hot air thereby shrinking the film tightly around the package.

The temperature of the air stream in the shrink tunnel will vary with film type and also will vary with the speed at which the package passes through the tunnel; however, the temperature must be high enough to shrink the film. For heat-shrinkable polyethylene, the temperature range is about 180° F.–230° F. It is preferred, however, that the temperature of the air stream in the tunnel be at least 230° F.

The apparatus and process of the present invention starts with the film and multiple individual units and by various integral steps forms a final complete package product.

The present invention utilizes a unique heat-sealing method which gives as high as 50% stronger seals to heat-shrinkable films. Conventional techniques give a seal with heat-shrinkable films which are discontinuous and weak due to the shrinking of the film away from the heat source. This problem is overcome by the present invention by forming a loop of excess film which is shrunk as the hot wire advances; thereby returning the film in the heat-seal area back to its original state under which it can be adequately sealed with a hot wire element. The cooling step is also important in the present invention since the seal on the completed package and on the advancing film is subjected to stress. If the film is released immediately after the seal is made, the seal, being in a semi-molten stage and not having reached maximum strength, will be weak.

The angle at which the carriage is placed, so that heat seals can be made at the leading and trailing corners diagonal to one another, has a 2-fold advantage in that (1) the seal is backed by the package articles thereby making it stronger and (2) it allows more access to the seal area for the heat-sealing and clamping unit.

The 2-step shrink method preferably used in the present invention selectively shrinks the edges of the package and then the film around the entire package. Shrinking the open ends first has the advantage in that sides are formed on the package which aid in containing the units.

What is claimed is:

1. A continuous article packaging process comprising, in combination: placing a first continuous sheet of heat shrinkable film having a transverse dimension greater than the length of said articles on a series of continuously moving receivers; depositing said article onto the film in said receivers; placing a second continuous sheet of heat-shrinkable film having the same transverse dimension as said first sheet over said article in said receivers; forming a loop in the two sheets of film between each receiver; clamping said sheets around the loop; heating and shrinking said loop and cutting through said loop to form heat seals for adjacent packages in the opposite diagonal corners of said package and which results in said articles being enclosed in a tube of said sheets; cooling said seals while free from tension and shrinking said sheets of film to encase said article and form a package with a substantially oval opening at each end thereof.

2. The process of claim 1 wherein the heat-shrinkable film is polyethylene.

3. The process comprising: passing at least two sheets of heat-shrinkable film in a superimposed flat position into a heat-seal zone; forming a loop in said films in said heat-seal zone; clamping said films around the loop; heating and shrinking said loop and cutting through said loop to form heat-seals on the severed sections of the films; cooling said seals while free from tension and releasing the clamped seals.

4. The process of claim 3 wherein the heat-shrinkable films are polyethylene.

5. An apparatus for heat-sealing heat shrinkable film comprising, in combination: an upper assembly having a stationary bar, a movable clamping bar resiliently suspended from said stationary bar, a heated wire suspended from said stationary bar through said movable clamping bar and pins attached to said stationary bar and extending through said movable clamping bar and a lower assembly having a grooved clamping bar in alignment with said upper movable clamping bar, a tucker bar resiliently mounted in the groove of said grooved clamping bar and adapted to be depressed by said pins attached to said upper assembly, said upper and lower assemblies mounted to be guided into clamping and sealing actuating positions.

6. An apparatus for heat-sealing heat shrinkable film comprising, in combination: a first clamping bar for engaging the film from one side and having a substantially hollow interior, a second clamping bar for engaging the film from the opposing side and having a substantially hollow interior which is in alignment with the hollow interior of said first bar, a stationary bar disposed above said first clamping bar, resilient means for suspending said first clamping bar from said stationary bar, a resistance sealer wire connected to an external electrical circuit suspended from said stationary bar into the hollow interior of said first clamping bar, tensioning means for keeping said wire taut, a pair of spaced pins attached to said stationary bar and extending into the opposing ends of the hollow interior of said first clamping bar, a tucker bar disposed in the hollow interior of said second clamping bar and extending into the hollow interior of said first clamping bar and adapted to be depressed by said pins, resilient means for maintaining said tucker bar in position and guide means for moving said first clamping bar into a clamping relationship with said second clamping bar and for actuating said tucker bar and sealer wire.

References Cited by the Examiner

UNITED STATES PATENTS

| | | | |
|---|---|---|---|
| 3,006,122 | 10/1961 | Weishaus | 53—182 |
| 3,011,294 | 12/1961 | Pancratz | 53—112 |
| 3,054,441 | 9/1962 | Gex et al. | 53—182 X |
| 3,111,221 | 11/1963 | Chapman et al. | |
| 3,172,246 | 3/1965 | Ruff | 53—182 X |

FRANK E. BAILEY, *Primary Examiner.*

GRANVILLE Y. CUSTER, JR., *Examiner.*

P. H. POHL, R. ALVEY, *Assistant Examiners.*